(12) United States Patent
Lehtinen et al.

(10) Patent No.: US 6,573,886 B1
(45) Date of Patent: Jun. 3, 2003

(54) DEVICE WITH TOUCH SENSITIVE SCREEN

(75) Inventors: Kari Lehtinen, Tampere (FI); Jouko Rytkonen, San Diego, CA (US)

(73) Assignee: Nokia Mobile Phones Limited, Espoo (FI)

( * ) Notice: Subject to any disclaimer, the term of this patent is extended or adjusted under 35 U.S.C. 154(b) by 137 days.

(21) Appl. No.: 09/636,318

(22) Filed: Aug. 11, 2000

(30) Foreign Application Priority Data

Aug. 11, 1999 (GB) .............................................. 9918957

(51) Int. Cl.⁷ .................................................. G09G 5/00
(52) U.S. Cl. ............. 345/173; 379/433.06; 379/433.12; 379/433.13; 455/90
(58) Field of Search ....................... 379/433.04, 433.06, 379/433.07, 433.12, 433.13; 345/173, 156, 168, 169; 455/90

(56) References Cited

U.S. PATENT DOCUMENTS

| 5,335,368 A | * | 8/1994 | Tamura ........................ 455/90 |
| 5,584,054 A | | 12/1996 | Tyneski et al. |
| 5,710,576 A | * | 1/1998 | Nishiyama et al. ......... 345/169 |
| 5,715,524 A | | 2/1998 | Jambhekar et al. |
| 5,742,894 A | | 4/1998 | Jambhekar et al. |
| 5,918,188 A | * | 6/1999 | Doran ........................ 379/433 |

FOREIGN PATENT DOCUMENTS

| JP | 404259156 A | * | 9/1992 |
| JP | 10049299 | | 2/1998 |
| WO | 9819434 | | 7/1998 |

* cited by examiner

Primary Examiner—Dennis-Doon Chow
(74) Attorney, Agent, or Firm—Antonelli, Terry, Stout & Kraus, LLP

(57) ABSTRACT

An electronic device comprising a housing 4, a display for entering and displaying data, the display being disposed in the housing and having a touch sensitive surface 6, and a cover 8 and 28. The cover is coupled to the housing 4 in a movable manner and movable between an open position and a closed position. When the cover is in the closed position, at least a portion of the touch sensitive surface 6 is covered by the cover. The device includes a sensor for sensing whether the cover is in the closed position. The sensor comprises a member 12 and 22 on the cover and a corresponding activation area 66 and 68 of the touch sensitive surface. The member and the corresponding activation area of the touch sensitive surface are in contact when the cover is in the closed position.

13 Claims, 3 Drawing Sheets

DEVICE WITH TOUCH SENSITIVE SCREEN

BACKGROUND OF THE INVENTION

The invention relates to electronic devices and in particular to an electronic device that has a main body housing and a movable cover coupled thereto. The cover is movable between a first, or closed, position and a second, or open, position. The device includes a touch sensitive screen arranged in the main body of the device.

When the cover is in the first, closed position, the cover obscures at least a portion of the touch sensitive screen. When the cover is in the second, open, position, the touch sensitive screen is exposed. Examples of such devices are personal organizers, personal digital assistants (PDA), communicators, laptops and radio telephone handsets. In such devices there may be the need to detect whether the cover is in the open or closed position. Known ways of achieving this include using Hall detectors, reed-relays, mechanical switches etc. All these solutions occupy significant space in the device and require dedicated components.

SUMMARY OF THE INVENTION

In accordance with the invention there is provided an electronic device comprising: a housing; a display for entering and displaying data, the display being disposed in the housing and having a touch sensitive surface; a cover being coupled to the housing in a movable manner and movable between an open position and a closed position, such that when the cover is in the closed position, at least a portion of the touch sensitive surface is covered by the cover; and a sensor for sensing whether the cover is in the closed position, the sensor comprising a member on the cover and a corresponding activation area of the touch sensitive surface, the member and the corresponding activation area of the touch sensitive surface being in contact when the cover is in the closed position.

Thus the invention provides a compact way of sensing whether the cover is open or closed. The sensor member on the cover exerts pressure on. a dedicated activation area of the touch sensitive screen when the cover is in the closed position. This pressure is removed when the cover is opened.

Preferably the activation area of the sensor is outside the active part of the screen used by a user of the device.

Preferably the sensor member on the cover comprises a protuberance which may be made from a deformable material.

Preferably the housing extends over the perimeter, of the display and an opening is provided in the housing adjacent the perimeter of the display to expose the activation area of the sensor, the opening and the sensor member on the cover being so positioned as to engage with each other when the cover is in the closed position.

The invention is applicable to any device having two movable parts and a touch sensitive screen. Such devices may be a radio communications device, such as a portable radiotelephone, or a personal organizer.

The invention also relates to a method of sensing whether the cover of a device is open or closed, the device having a housing, a display for entering and displaying data, the display being disposed in the housing and having a touch sensitive surface, and a cover coupled to the housing in a movable manner and movable between an open position and a closed position, such that when the cover is in the closed position, at least a portion of the touch sensitive surface is covered by the cover. The method comprises detecting whether pressure is applied to a dedicated activation area of the touch sensitive surface, and when such pressure is detected sensing that the cover is in the closed position.

According to a further aspect of the invention, there is provided a portable communication device comprising a housing having a front surface; a cover coupled to the housing in a movable manner, the cover being movable between an open position and a closed position in which a surface of the cover is adjacent the front surface of the housing; a display screen located in the front surface of the housing, the display screen having a touch sensitive screen operative when the cover is in an open position for receiving data via the touch sensitive screen in response to pressure applied to the touch sensitive screen; and a sensor comprising a member on the cover and an area of the touch sensitive screen that is aligned with and in contact with the member on the cover when the cover is in the closed position.

BRIEF DESCRIPTION OF THE DRAWINGS

The invention will now be described by way of example only with reference to the accompanying drawings in which.

DETAILED DESCRIPTION OF THE INVENTION

The present invention relates to an electronic device that has a main body housing and a movable cover coupled thereto. The cover is movable between a first, or closed, position and a second, or open, position. The device includes a touch sensitive screen arranged in the main body of the device. When the cover is in the first, closed position, the cover obscures at least a portion of the touch sensitive screen. When the cover is in the second, open, position, the touch sensitive screen is exposed.

Figures 1A, 1B:
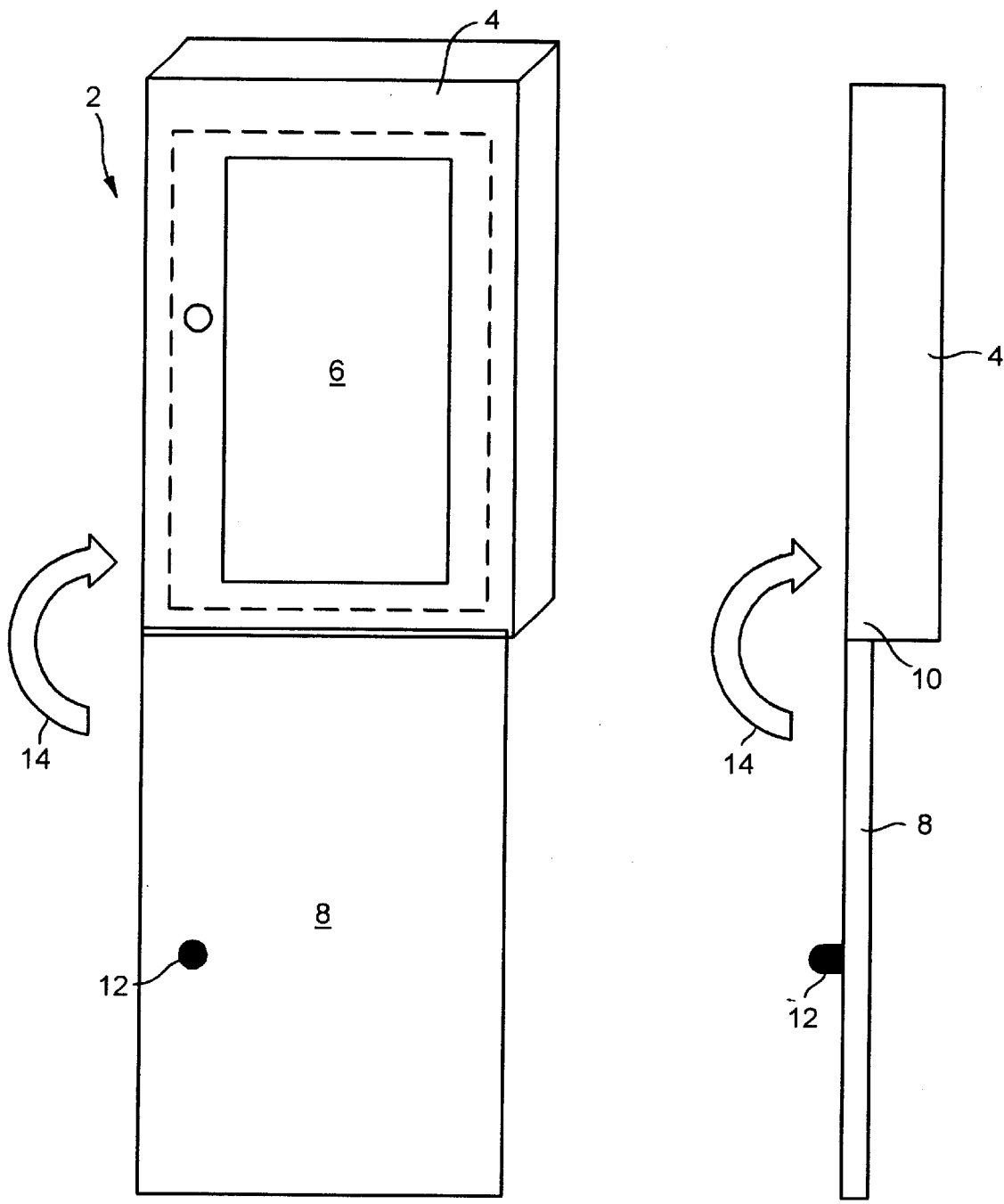
FIG. 1a shows a front perspective view of a first embodiment of a portable device in accordance with the invention, with the cover in an open position.
FIG. 1b shows a side view of the portable device of FIG. 1a, with the cover in an open position.

FIGS. 1a and 1b show a first embodiment of a portable device according to the invention. The device 2 comprises a main body 4 and a cover 8 that is connected to the main body 4 of the device by a hinge 10. The cover 8 is movable between an open position (as shown) to a closed position when the cover 8 is rotated about the hinge 10 in a direction as shown by the arrow 14 until the cover 8 lies against the main housing 4. The main body 4 includes a display having a touch sensitive screen 6.

Figure 2:
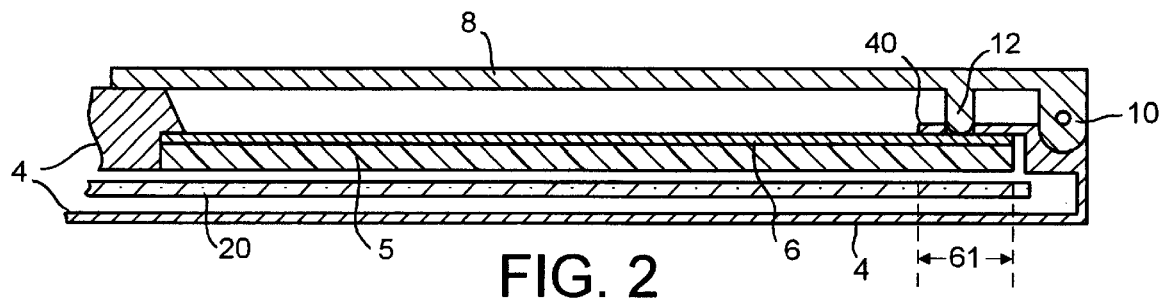
FIG. 2 shows a partial cross-sectional view of the device shown in FIG. 1 a when in the closed position.

FIG. 2 shows, in cross-section, the device shown in FIGS. 1a and 1b. The main body 4 houses a display and a board 20 for the electronics of the device. The display comprises a conventional display apparatus 5 (e.g. a LCD display) and a touch sensitive screen 6 for indicating to the main control unit of the device when the touch sensitive screen has been activated. The touch sensitive screen covers one surface of the display apparatus. The display is disposed in the main body 4 in such a manner that a first portion 61 of the display is exposed and a second portion of the display is not visible, being behind the front face 40 of the main housing.

As is well known, the touch sensitive screen may be made from any suitable material having properties which change when pressure is applied to the material. For instance (as is well known) the material may be one in which the resistive characteristics change or the capacitative characteristics change.

The cover 8 has a small protuberance 12 on the surface of the cover that is adjacent the touch screen 6 when in the closed position. This protuberance is preferably deformable, being made from a material such as an elastomer or a thermoplastic elastomer (TPE) (e.g. Santoprene® rubber made by, Storm Products Company). The protuberance 12 co-operates with an activation area of the touch sensitive screen to form a sensor, as will be described below.

Figure 3:
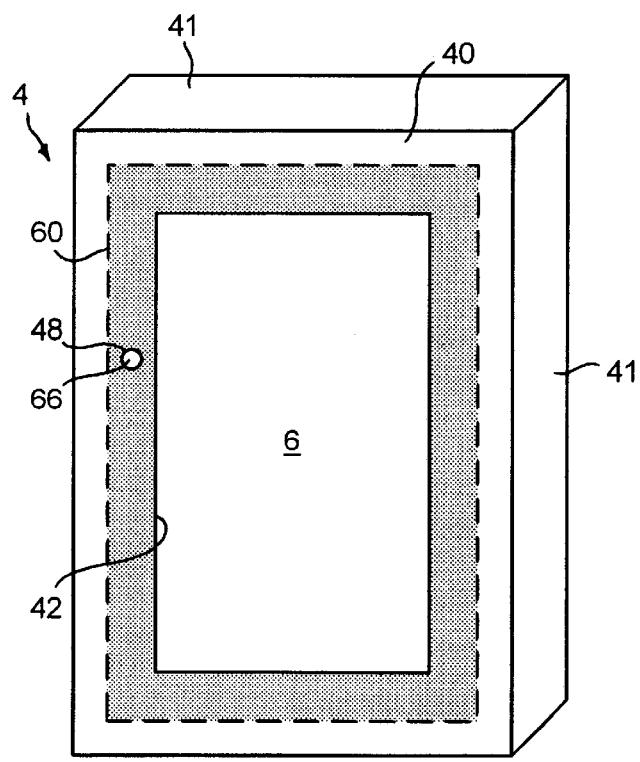
FIG. 3 shows a more detailed view of the display of the device shown in FIG. 1.

FIG. 3 shows a more detailed view of the front view of the first embodiment of the invention. The main body 4 comprises a front face 40, side faces 41 (only two of which can be seen) and a rear face (which cannot be seen). The front face 40 has an aperture 42 through which the touch sensitive screen 6 is visible. The aperture defines the active part of the touch sensitive screen 6 that is accessible to touching by the user. The perimeter 60 of the touch sensitive screen extends beyond the perimeter of the aperture 42 and is not visible to the user of the device 2. An opening 48 is provided in the front face of the main body 4. The opening 48 is positioned to be above a portion of the touch sensitive screen 6 that is behind the front face 40. Thus the opening 48 exposes an activation area 66 of the touch screen 6. The position of the protuberance 12 on the hinged cover 8 corresponds to the position of the opening 48 in the front face 40 of the main housing 4, when the cover 8 is in a closed position.

The protuberance 12 and the corresponding activation area 66 of the touch screen 6 together form a sensor for determining whether the cover 8 of the device is open or closed.

When the cover 8 is moved to the closed position (as can be seen in FIG. 2), the protuberance 12 extends through the opening 48 in the front cover 40 of the main body of the device and presses against the surface of the touch sensitive screen. Control circuitry (not shown) associated with the touch sensitive screen 6 senses the change in pressure and, in response, sends a signal to the main control unit of the device. In response, the main control unit switches the device into a dormant mode. To a user, the device 2 will appear to be switched off but at least the circuitry that detects pressure changes on the touch sensitive screen is still active. Having the touch sensitive screen active while in a dormant mode results in a manageable current "drain" of the order of a couple of hundreds of microamps.

When the cover 8 is opened by pivoting the cover about the hinge 10, the protuberance moves out of contact with the activation area 66 of the touch sensitive screen 6. In response, the control circuitry of the touch sensitive screen detects the removal of the pressure of the protuberance 12 on the exposed area 66 of the touch sensitive screen 6 and sends a signal to the main control unit of the device. In response, the main control unit of the device enables the device e.g. by enabling the display 5 behind the touch sensitive screen.

Figures 4A, 4B:
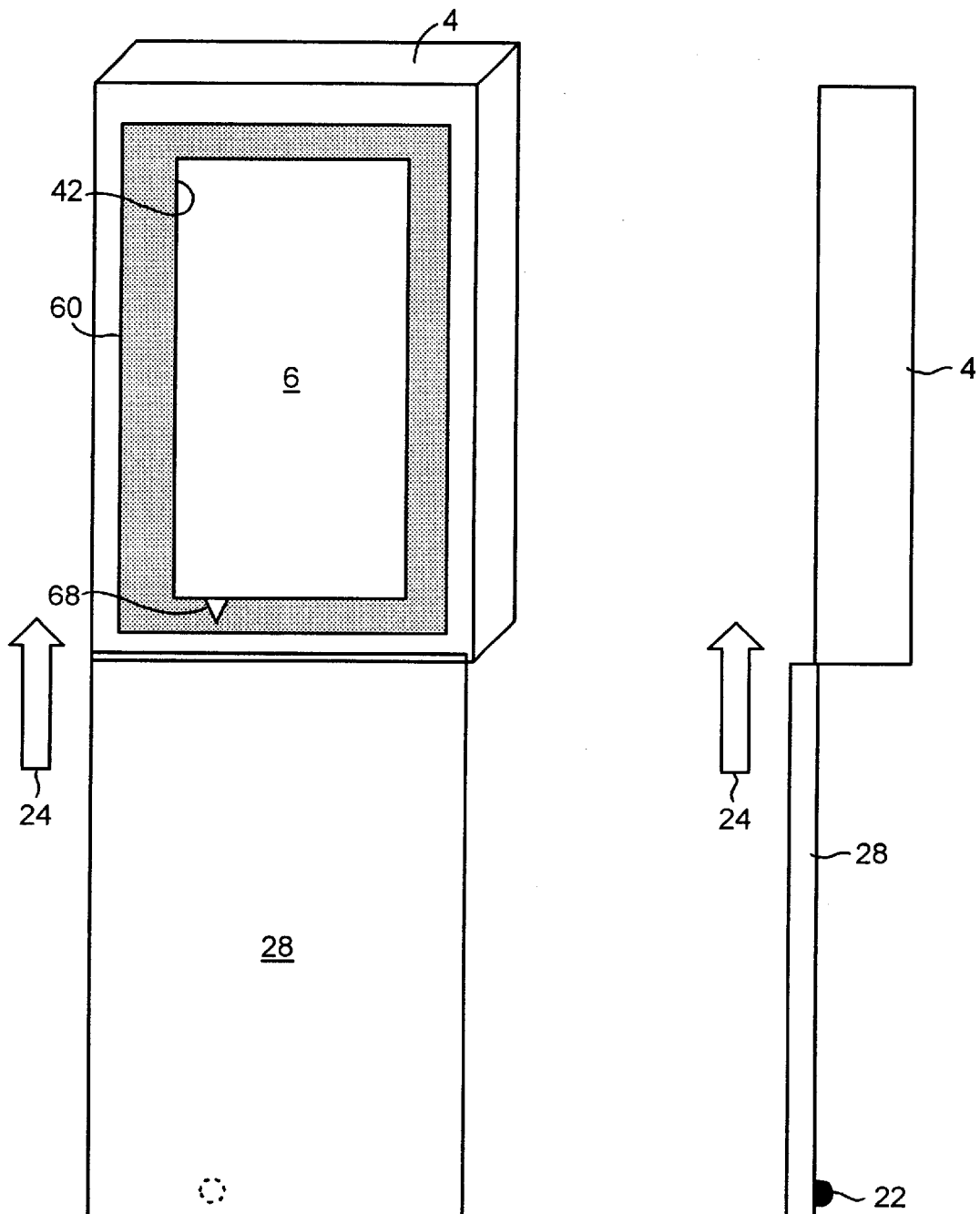
FIG. 4a shows a front perspective view of a second embodiment of a portable device according to the invention with a cover in an open position.
FIG. 4b shows a side view of the second embodiment of a portable device, with the cover in an open position.

FIGS. 4a and 4b show a second embodiment of the invention. Elements that are common with the embodiment shown in FIG. 1 are indicated by the same numerals. In this embodiment, the cover 28 is connected to the main body 4 in a slideable manner such that the cover 28 can slide into a closed position in a direction as indicated by arrow 24. A protuberance 22 is provided on the surface of the cover 18 which, when in the closed position, is adjacent the touch sensitive screen 6 (see FIG. 4b). A corresponding activation area 68 of the touch screen is provided which, together with the protuberance 22, forms a sensor for detecting whether the cover is in an open or closed position.

In this embodiment, the activation area 68 is formed by providing an outwardly extending notch in the aperture 42. In the slide embodiment as shown in FIGS. 4a and b, the protuberance 22 is provided at the end of the cover 28 that is distal from the main body 4 when in the open position. This is so that the protuberance 22 does not contact the touch screen 6 unless the cover is in a fully closed position.

Alternatively, the activation area may be formed by an opening in the front face of the housing 4, as described with reference to FIGS. 1a and 1b. In this case, the opening preferably has a ramped edge so that the protuberance 22 can slide easily into the opening. Preferably the edge of the opening adjacent the aperture 42 is un-ramped to prevent the opening from being over-shot by the protuberance. This may also serve to maintain the slide cover 28 in a closed position.

Generally the sensor for sensing whether the cover is open or closed comprises a dedicated exposed area of the touch sensitive screen and a protuberance on the cover. Preferably, the dedicated exposed area of the touch sensitive screen is provided in a position that would not ordinarily be contacted by a user when using the device in a conventional manner.

The device may also be provided with latch elements on the main housing 4 and cover 8 and 28 to maintain the cover in the closed position.

In response to detecting the removal of pressure in the exposed area 66 and 68 the main control unit of the device may enable other operations e.g. changing the display mode, waking up the device from the dormant mode, answering/ending a call, etc.

The invention is applicable to any device having a touch sensitive screen and at least two parts movable relative to each other. Examples of such devices are radio telephone handsets, personal organizers, communicators, laptops etc. In the case of a device having radio telecommunications capability, moving the cover from a closed position may result in the establishing of a communication channel.

The cover 8 and 28 may also include functional elements. For instance the cover 8 and 28 may include user interface elements e.g. a keypad, a joystick, a rollerkey etc to input data to the device when the device is in the closed position. The sensor described above may also be used to disable all or some of the functional elements provided in the cover 8 and 28 when the cover of the device is opened.

What is claimed is:

1. An electronic device comprising:
   a housing;
   a display which enters and displays data, the display being disposed in the housing and having a touch sensitive surface;
   a cover which is coupled to the housing in a movable manner, is movable between an open position and a closed position and when the cover is in the closed position, at least a portion of the touch sensitive surface is covered by the cover;
   a sensor which senses whether the cover is in the closed position, the sensor comprising a member on the cover and a corresponding activation area of the touch sensitive surface which is dedicated to sensing the closed position of the cover, the member and the corresponding activation area of the touch sensitive surface being in contact when the cover is in the closed position; and the housing extends over a perimeter of the display and an opening is provided in the housing adjacent the perimeter of the display to expose the activation area of the sensor used by a user of the device and the member extends through the opening to engage the activation area when the cover is in the closed position.

2. A device according to claim 1 wherein:

the member of the sensor on the cover comprises a protuberance.

3. A device according to claim 2 wherein:

the protuberance is made from a deformable material.

4. A device according to claim 3 wherein:

the activation area of the touch sensitive surface is outside an active area of the touch sensitive surface that is used by a user of the device.

5. A device according to claim 2 wherein:

the activation area of the touch sensitive surface is outside an active area of the touch sensitive surface that is used by a user of the device.

6. A device according to claim 1 wherein:

the activation area of the touch sensitive surface is outside an active area of the touch sensitive surface that is used by a user of the device.

7. A device according to claim 1 wherein:

the device is a radio communications device.

8. A device according to claim 1 wherein:

the device is a personal organizer.

9. A device according to claim 1 wherein:

the device is a portable radiotelephone.

10. A method of sensing whether the cover of a device is open or closed, the device including a housing, a display which enters and displays data, the display being disposed in the housing and having a touch sensitive surface, and a cover which is coupled to the housing in a movable manner, is movable between an open position and a closed position, and when the cover is in the closed position, at least a portion of the touch sensitive surface is covered by the cover; the method comprising:

detecting whether a pressure is applied to an activation area of the touch sensitive surface which is dedicated to sensing the closed position of the cover; and wherein when the pressure is detected, sensing that the cover is in the closed position and the housing extends over a perimeter of the display and an opening is provided in the housing adjacent the perimeter of the display to expose the activation area of the sensor used by a user of the device and the member extends through the opening to engage the activation area when the cover is in the closed position.

11. A method in accordance with claim 10 wherein:

the activation area of the touch sensitive surface is outside an active area of the touch sensitive surface that is used by a user of the device.

12. A portable communication device comprising:

a housing having a front surface;

a cover which is coupled to the housing in a movable manner, is movable between an open position and a closed position in which a surface of the cover is adjacent the front surface of the housing;

a display screen located in the front surface of the housing, the display screen including a touch sensitive screen operative when the cover is in an open position for receiving data via the touch sensitive screen in response to pressure applied to an area of the touch sensitive screen which is dedicated to sensing the closed position of the cover; and a sensor comprising a member on the cover and an area of the touch sensitive screen which is dedicated to sensing the closed position of the cover and the area is in contact with the member on the cover when the cover is in the closed position, the housing extends over a perimeter of the display and an opening is provided in the housing adjacent the perimeter of the display to expose the activation area of the sensor used by a user of the device and the member extends through the opening to engage the activation area when the cover is in the closed position.

13. A portable communication device according to claim 12 wherein:

the activation area of the touch sensitive surface is outside an active area of the touch sensitive surface that is used by a user of the device.

\* \* \* \* \*